Oct. 28, 1969

R. G. SARGEANT 3,474,764

SWEPT SURFACE HEATER

Filed Sept. 16, 1968

INVENTOR.
RALPH G. SARGEANT
BY
J. Hanson Boyden,
ATTORNEY

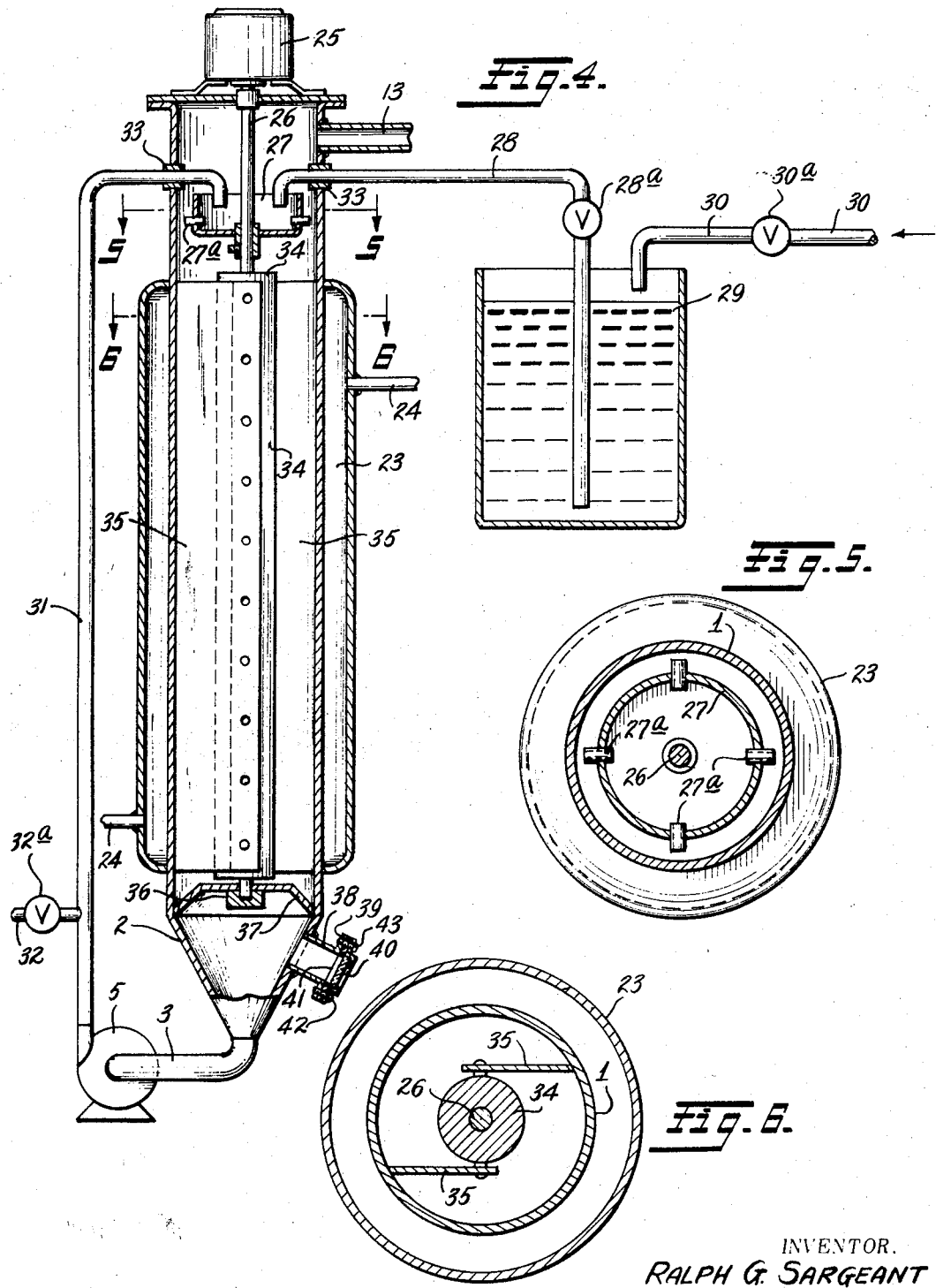

United States Patent Office 3,474,764
Patented Oct. 28, 1969

3,474,764
SWEPT SURFACE HEATER
Ralph G. Sargeant, 408 W. Windsor St.,
Lakeland, Fla. 33803
Continuation-in-part of application Ser. No. 289,702,
June 21, 1963. This application Sept. 16, 1968, Ser.
No. 762,244
Int. Cl. F22b 1/02
U.S. Cl. 122—34    3 Claims

ABSTRACT OF THE DISCLOSURE

A heating device for evaporating water from liquids in which the liquid is heated in a container having scraper blades to sweep the liquid from the container wall, and agitate the liquid. The heated liquid is circulated from the lower portion of an evaporator or vacuum chamber through the heated container and are sprayed into the upper portion of the evaporator whereby the vapors from the liquid material are separated and removed from the liquid.

---

This application is a continuation-in-part of my prior co-pending application Ser. No. 289,702, filed June 21, 1963, now Patent No. 3,428,463.

In that application there is shown and described a heating device for liquid materials commonly known as a "swept surface" heater. This heater comprises a rotary shaft carrying a plurality of scraper blades which sweep over the inner surface of a cylinder through which the liquid material being heated flows, thus preventing sticking of the material to the walls of the cylinder. The apparatus also has other advantages. Heat is supplied by a fluid heating medium circulating around the outside of the cylinder.

Said prior application also disclosed an evaporator or vacuum chamber into which the heated liquid material was discharged, and a circulating or re-cycling pump for forcing the liquid material from the bottom of the evaporator up through the swept surface heater and back into the top of the evaporator as many times as desired.

The present invention also uses this same type of re-cycling pump arrangement.

I have now discovered that a "swept surface" heater can be successfully produced by mounting the scraper blades on a shaft rotating within the cylindrical evaporator itself, the scraper blades engaging and sweeping over the inside of the evaporator walls, while the liquid to be heated flows by gravity down along such walls, assisted by the rapid rotation of the scraper blades. As in the previously mentioned disclosure, the evaporator walls are heated by means of a fluid heating medium circulated through a jacket surrounding such walls.

An object of the invention is therefore to produce a swept surface heater in which the scraper blades sweep over and engage the inside of the walls of the evaporating chamber itself, and to provide a pump for re-cycling the liquid material through the evaporating chamber as many times as desired.

A subsidiary object is to provide means independent of said re-cycling pump for feeding fresh liquid material into the top of said chamber.

In order that the invention may be readily understood, reference is had to the accompanying drawings forming part of this specification and in which:

FIG. 4 is a side elevation of my improved arrangement wherein the swept surface heater is built into the evaporator itself.

FIG. 5 is a transverse section taken substantially on the line 5—5 of FIGURE 4, looking in the direction of the arrows, and FIG. 6 is a transverse section substantially on the line 6—6 of FIGURE 4, looking in the direction of the arrows.

Figure 1:
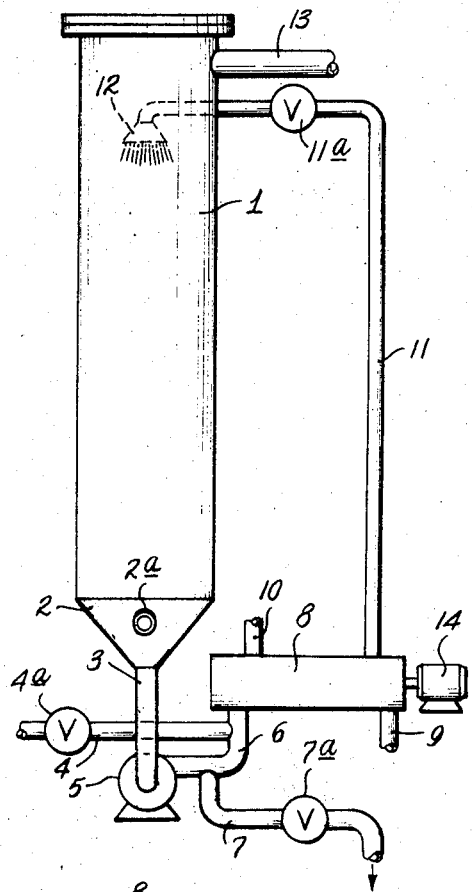
FIG. 1 is a side elevation showing the evaporator and the swept surface heater, outside of the evaporator.
Figure 2:
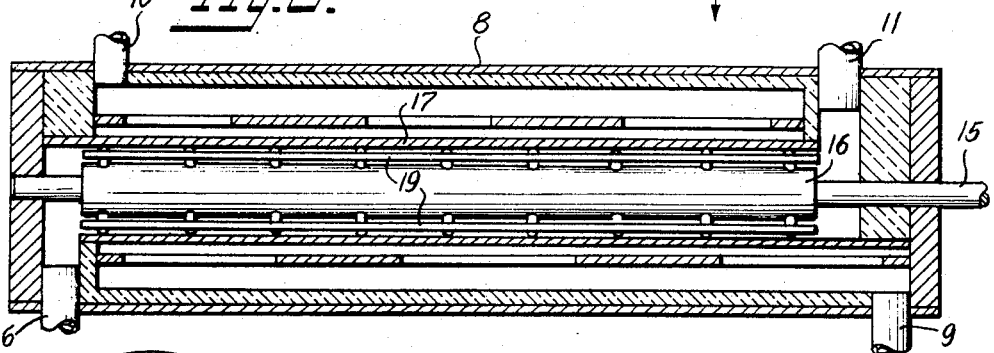
FIG. 2 is a longitudinal section on an enlarged scale through the heater itself.
Figure 3:
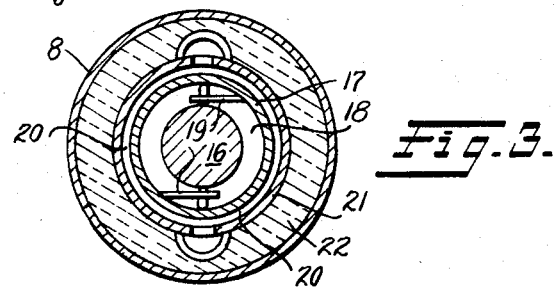
FIG. 3 is a transverse section through FIGURE 2.

Referring to the drawings in detail, and more particularly first to FIGURES 1 to 3 thereof, a conventional evaporator is shown at 1, and comprises an upright cylindrical chamber having a conical bottom portion 2, provided with any desired type of sight glass 2a, this conical portion being connected by a pipe 3 to a centrifugal pump 5. The liquid to be heated is introduced through a valve 4a and pipe 4 into a pipe 6 extending from the discharge side of the centrifugal pump 5. Another pipe 7 tapping the pipe 6 and controlled by a valve 7a provides for the discharge of the concentrated liquid.

As shown in FIGURES 1 and 2, the pipe 6 delivers into one end of a swept surface heater designated in its entirety by the reference numeral 8, and is discharged from such heater through a pipe 11. This extends to a point near the top of the evaporator 1 and under the control of a valve 11a discharges from a spray head 12 into the upper part of the evaporator. This evaporator may be provided with a heating jacket such as indicated at 23 in FIGURE 4 if desired. The vapors from the liquid material being heated and sprayed into the evaporator are drawn off through a pipe 13 leading to a suitable condenser and vacuum pump (not shown).

As illustrated in FIGURES 2 and 3, the swept surface heater itself comprises a shaft 15 driven by a motor 14. On the shaft 15 is mounted a drum 16 at the periphery of which is secured a pair of scraper blades 19 projecting transversely therefrom. These blades engage and sweep over the interior surface of a cylinder 17 separated from the drum 16 by an annular space 18.

Surrounding the cylinder 17 is a second cylinder 21 separated from the cylinder 17 by an annular space 20. Through this annular space a suitable heating fluid such as steam or hot water is caused to circulate by means of the inlet and outlet pipes 9 and 10. This outer cylinder 21 is preferably surrounded by a mass of insulating material 22. The liquid to be heated is introduced from any desired source through pipe 4 and thence through pipe 6 into the annular space 18, in which it flows longitudinally of the heater and is discharged through the pipe 11. Meanwhile, the motor 14 rotates the shaft 15 and drum 16 and causes the scraper blades to sweep over the inner surface of the cylinder 17 as the liquid material flows lengthwise through this cylinder.

Meanwhile the centrifugal pump 5 re-cycles the liquid material from the pipe 3 extending from the bottom of the evaporator up through pipe 6 and thence through the sweep surface heater as just described, the liquid material being discharged from the heater through the pipe 11 and into the spray head 12 near the top of the evaporator. This re-cycling operation can be continued for as long as desired until the liquid material has reached the desired consistency or density.

Two things about FIGURE 1 will be particularly noted. The first is that while the sweep surface heater 8 is of a generally well known type, it is believed to be a novel feature to have this swept surface heater arranged to deliver directly into the upper part of an upright elongated evaporator.

The second thing to be noted is that the fresh liquid material may be introduced through pipe 4 into the circulating system independently of the re-cycling pump 5, in other words, the fresh liquid material may be introduced through pipe 4 and the finished material drawn off through pipe 7 as desired, while the pump 5 continues to re-cycle the material.

Referring now to FIGURES 4 to 6, I have illustrated my improved arrangement in which the scraper blades of the swept surface device are mounted inside of the evaporator itself.

In these figures as in the previous figures the vertically disposed cylindrical evaporating chamber is designated by the numeral 1 and as shown in FIGURE 4 it is surrounded by a jacket 23 through which a suitable heating medium such as hot water or steam is circulated by means of the pipes 24. Similarly, the reference numeral 13, as in the former figures designates the condit through which the vapors are withdrawn by means of a vacuum pump (not shown).

Superposed upon the top of the evaporator 1 is a motor 25, having a shaft 26 extending down coaxially of the evaporator and carrying throughout the major portion of its length a drum 34 on the periphery of which scraper blades 35 are mounted, as most clearly shown in FIGURE 6. These scraper blades engage and sweep over the interior surface of the evaporator 1 which should be made of stainless steel or other smooth material.

The lower end of the shaft 26 is mounted in a thrust bearing 36 supported by a suitable grid 37, having openings through which the liquid material may freely pass.

The bottom of the evaporator is preferably conical as before and a pipe 3 connects this bottom with a centrifugal pump 5, as in the previous figures. The liquid material is discharged from the pump 5 up through a pipe 31, which passes inwardly through the wall of the evaporator at a point above the drum 34.

The end of the pipe 31 is turned downwardly so as to discharge into a rotating bowl 27 secured to the shaft 26. As shown in FIGURE 5, this bowl has a series of radially extending spouts or nipples 27a through which the liquid material is discharged outwardly by gravity into contact with the inside of the evaporator.

As in the previous figures, it will be understood that the pump 5 re-cycles the liquid material from the bottom of the evaporator up through pipe 31 and into the bowl 27 from which it is discharged against the walls of the evaporator and flows downwardly there along, meanwhile being prevented from sticking by the operation of the scraper blades 35, and it will be seen that this re-cycling operation can be continued as long as desired.

Tapping the pipe 31 is the draw-off pipe 32 controlled by a valve 32a.

Fresh liquid is introduce into the bowl 27 through a pipe 28, controlled by a valve 28a from a suitable reservoir 29 to which liquid may be supplied from time to time, by means of a pipe 30 controlled by a valve 30a.

It will be understood that a high vacuum is maintained in the evaporator as is the common practice and because of this high vacuum, all that is necessary to introduce fresh liquid into the evaporator is to open the valve 28a. When this is done the vacuum will cause liquid flow through the pipe 28 into the top of the evaporator, more specifically into the rotating bowl 27. Thus it will be seen that fresh liquid can be introduced into the evaporator independently of the re-cycling 5.

It will be understood that both the pipes 31 and 28 are provided with airtight joints 33 where they pass through the wall of the evaporator.

In order to indicate the level of the liquid in the conical bottom 2 of the evaporator I prefer to use a sight glass constructed as follows: Surrounding a relatively large opening in the side of the conical bottom is a short stainless steel tube 38, secured to the control bottom as by welding. This tube, at its outer end is formed with a pair of outwardly projecting ears 39. A gasket 41 of rubber or similar soft material is placed upon the outer end of the tube 38 and on this gasket is placed a glass disc 40. This is covered around the edges by a cup 42 which also has a pair of projecting ears registering with those on the tube 38 and the assembly of gasket glass disc and cup is held together by means of screws or bolts 43 passing through the pairs of registering ears.

What I claim is:

1. Apparatus for evaporating water from liquids containing it comprising a cylinder, a drum extending axially through said cylinder so as to provide an annular space between itself and the interior of said cylinder, means for circulating a heating medium around the outside of said cylinder, whereby said annular space is heated, means for feeding the liquid to be evaporated into one end of said annular heated spaced and discharging it from the other, scraper blades mounted on and projecting from the periphery of said drum transversely through said annular space into substantial contact with the interior of said cylinder, means for rotating said drum so as to cause said blades to sweep over such walls and scrape the liquid therefrom and agitate the same, thus constituting a "swept surface" heater, a pump for re-cycling the liquid through said annular heated space as often as desired, and means for separating the water vapor from the remaining liquid.

2. Apparatus in accordance with claim 1 in which the cylinder is disposed vertically and constitutes an evaporating chamber, and means for maintaining said chamber undfer high vacuum.

3. Apparatus in accordance with claim 1 in which means independent of said re-cycling pump are provided for feeding fresh liquid into said annular space.

References Cited

UNITED STATES PATENTS

| 1,257,854 | 2/1918 | Harris | 122—34 XR |
| 2,499,302 | 2/1950 | Emhardt | 122—34 XR |
| 2,718,215 | 9/1955 | Eckstrom | 122—34 |

KENNETH W. SPRAGUE, Primary Examiner